United States Patent
Carciero

(10) Patent No.: US 10,694,729 B2
(45) Date of Patent: Jun. 30, 2020

(54) FISHING APPARATUS AND METHOD

(71) Applicant: John J. Carciero, Reading, MA (US)

(72) Inventor: John J. Carciero, Reading, MA (US)

( * ) Notice: Subject to any disclaimer, the term of this patent is extended or adjusted under 35 U.S.C. 154(b) by 682 days.

(21) Appl. No.: 15/292,840

(22) Filed: Oct. 13, 2016

(65) Prior Publication Data

US 2017/0105399 A1 Apr. 20, 2017

Related U.S. Application Data

(60) Provisional application No. 62/242,642, filed on Oct. 16, 2015.

(51) Int. Cl.
| | | |
|---|---|---|
| *A01K 91/06* | (2006.01) | |
| *A01K 97/00* | (2006.01) | |
| *A01K 93/00* | (2006.01) | |
| *A01K 99/00* | (2006.01) | |

(52) U.S. Cl.
CPC .............. *A01K 91/06* (2013.01); *A01K 93/00* (2013.01); *A01K 97/00* (2013.01); *A01K 99/00* (2013.01)

(58) Field of Classification Search
CPC ........ A01K 91/06; A01K 91/10; A01K 93/00; A01K 97/00; A01K 99/00
USPC ........ 43/4.5, 6.5, 15, 17, 42.02, 42.03, 43.1; 441/2, 30, 31
See application file for complete search history.

(56) References Cited

U.S. PATENT DOCUMENTS

| | | | |
|---|---|---|---|
| 843,946 A | | 2/1907 | Howald |
| 2,415,742 A * | | 2/1947 | Hiltabidel .............. A01K 85/01 43/42.06 |
| 2,537,321 A * | | 1/1951 | Walton .................... A01K 91/06 43/43.1 |
| 2,767,501 A | | 10/1956 | Bjorksten |
| 2,821,804 A * | | 2/1958 | Smith ..................... A01K 91/06 43/15 |
| 3,071,787 A * | | 1/1963 | Burker ................... A01K 93/00 222/5 |
| 3,256,538 A * | | 6/1966 | Waller .................... B63B 22/22 367/106 |
| RE28,331 E * | | 2/1975 | Nordeen ................ A01K 93/02 43/43.14 |
| 3,878,635 A * | | 4/1975 | Trosper ................. A01K 97/125 43/17 |
| 4,507,093 A | | 3/1985 | Norvell |
| 4,794,720 A * | | 1/1989 | Robertaccio ........... A01K 85/00 43/42 |
| 4,805,336 A * | | 2/1989 | Heyerman ............. A01K 97/01 242/301 |
| 4,823,325 A | | 4/1989 | Cole, Jr. |
| 4,850,128 A * | | 7/1989 | Cotillier, Sr. .......... A01K 79/00 43/4 |
| 5,205,062 A * | | 4/1993 | Zimmerman ........ A01K 85/005 43/42.02 |

(Continued)

FOREIGN PATENT DOCUMENTS

JP 2007236370 A * 9/2007 ............. A01K 79/00

*Primary Examiner* — Tien Q Dinh
*Assistant Examiner* — Brady W Frazier
(74) *Attorney, Agent, or Firm* — Stan Collier, Esq.

(57) ABSTRACT

A fish chute and method for assisting fishermen in retrieving fish that have been hooked, particularly large game fish. Once a fish has been hooked, the fish chute deploys a chute. As the fish tries to swim away, the chute acts as a drag, slowing the fish down and causing it to tire.

19 Claims, 5 Drawing Sheets

(56) References Cited

U.S. PATENT DOCUMENTS

| | | | | |
|---|---|---|---|---|
| 5,918,407 | A * | 7/1999 | Sebestyen | A01K 91/08 43/27.4 |
| 7,596,901 | B1 * | 10/2009 | Johnson | A01K 91/10 114/298 |
| 2005/0198889 | A1 * | 9/2005 | Lubinsky | A01K 85/16 43/42.02 |
| 2007/0089655 | A1 * | 4/2007 | Olson | B63B 22/10 114/51 |
| 2007/0264890 | A1 * | 11/2007 | Brown | A01K 69/00 441/30 |
| 2008/0311805 | A1 * | 12/2008 | Spears | B63B 22/08 441/30 |
| 2010/0000143 | A1 * | 1/2010 | Pekin | A01K 89/00 43/17 |
| 2014/0033598 | A1 * | 2/2014 | Camp | A01K 93/00 43/4.5 |
| 2015/0181847 | A1 * | 7/2015 | Alshammari | A01K 85/005 43/17 |

* cited by examiner

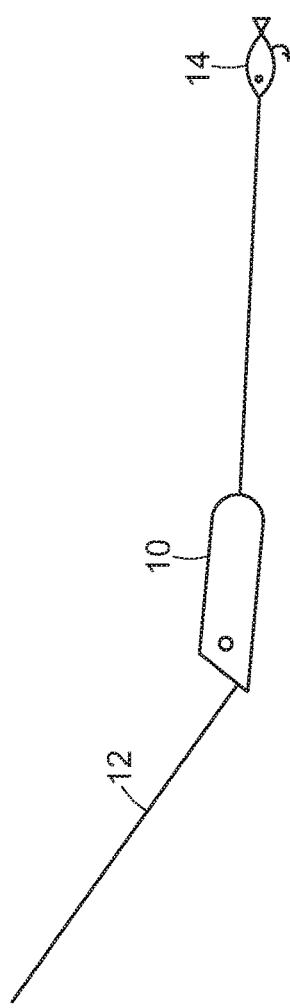
FIG. 1A
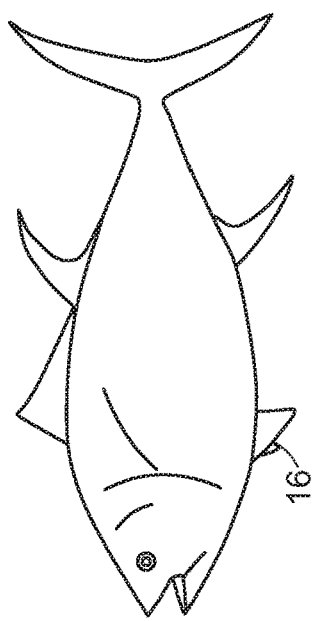
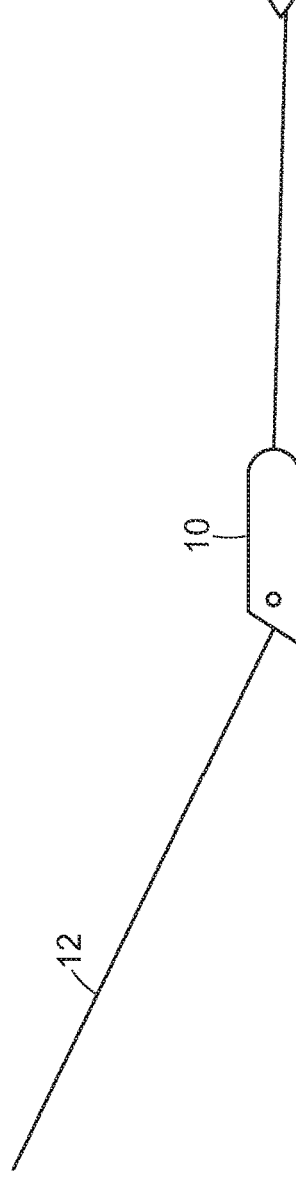
FIG. 1B
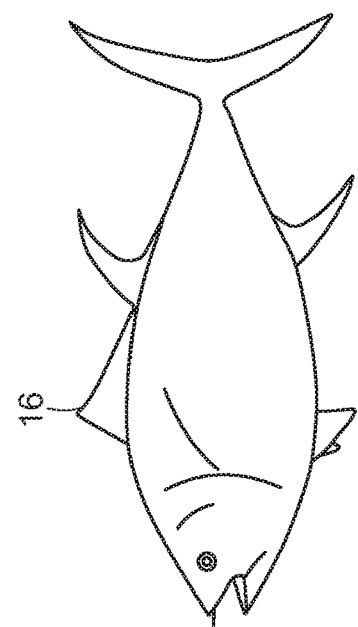

TEASER

BOBBER

UMBRELLA RIG

Camera/light

FISHING APPARATUS AND METHOD

CROSS REFERENCE TO RELATED APPLICATION

This application claims priority from U.S. Provisional Patent Application No. 62/242,642 filed on Oct. 16, 2015 and entitled FISHING APPARATUS AND METHOD, which is hereby incorporated by reference.

BACKGROUND

The present application relates generally to fishing and, more particularly, to an apparatus for assisting fishermen in retrieving fish that have been hooked, particularly large game fish like tuna that either dwell on the bottom of water bodies or tend to head to the bottom after being hooked.

BRIEF DESCRIPTION OF THE DRAWINGS

FIGS. 1A, 1B, and 1C are simplified drawings generally illustrating operation of a fish chute in accordance with one or more embodiments.

Like or identical reference numbers are used to identify common or similar elements.

BRIEF SUMMARY OF THE DISCLOSURE

A fish chute in accordance with one or more embodiments is connectable in a fishing line between a rod and a hook. The fish chute comprises a chute in a collapsed state and a compressed gas cartridge cooperatively arranged with the chute to launch the chute when activated. The fish chute also includes a switch operably connected to the compressed gas cartridge and to the fishing line. The switch is configured to activate the compressed gas cartridge when drag on the fishing line exceeds a given force to launch the chute into a deployed state.

A fish chute in accordance with one or more further embodiments includes a housing having a first element connectable with a line leading to a rod and second element connectable with a line leading to a hook, a chute in a collapsed state in the housing, and a compressed gas cartridge cooperatively arranged with the chute in the housing to launch the chute when activated. The fish chute also includes a switch in the housing operably connected to the compressed gas cartridge and to the first or second element. The switch is configured to activate the compressed gas cartridge when drag on the fishing line exceeds a given force to launch the chute out of said housing into a deployed state.

A fishing method in accordance with one or more embodiments comprises (a) connecting a fish chute in a fishing line between a rod and a hook, and (b) when a fish is hooked and on a drag pulling run, adjusting drag on the rod to a force that is higher than a given force to activate a compressed gas cartridge in the fish chute to launch a chute from the fish chute to resist movement of the fish.

DETAILED DESCRIPTION

Figure 1C:
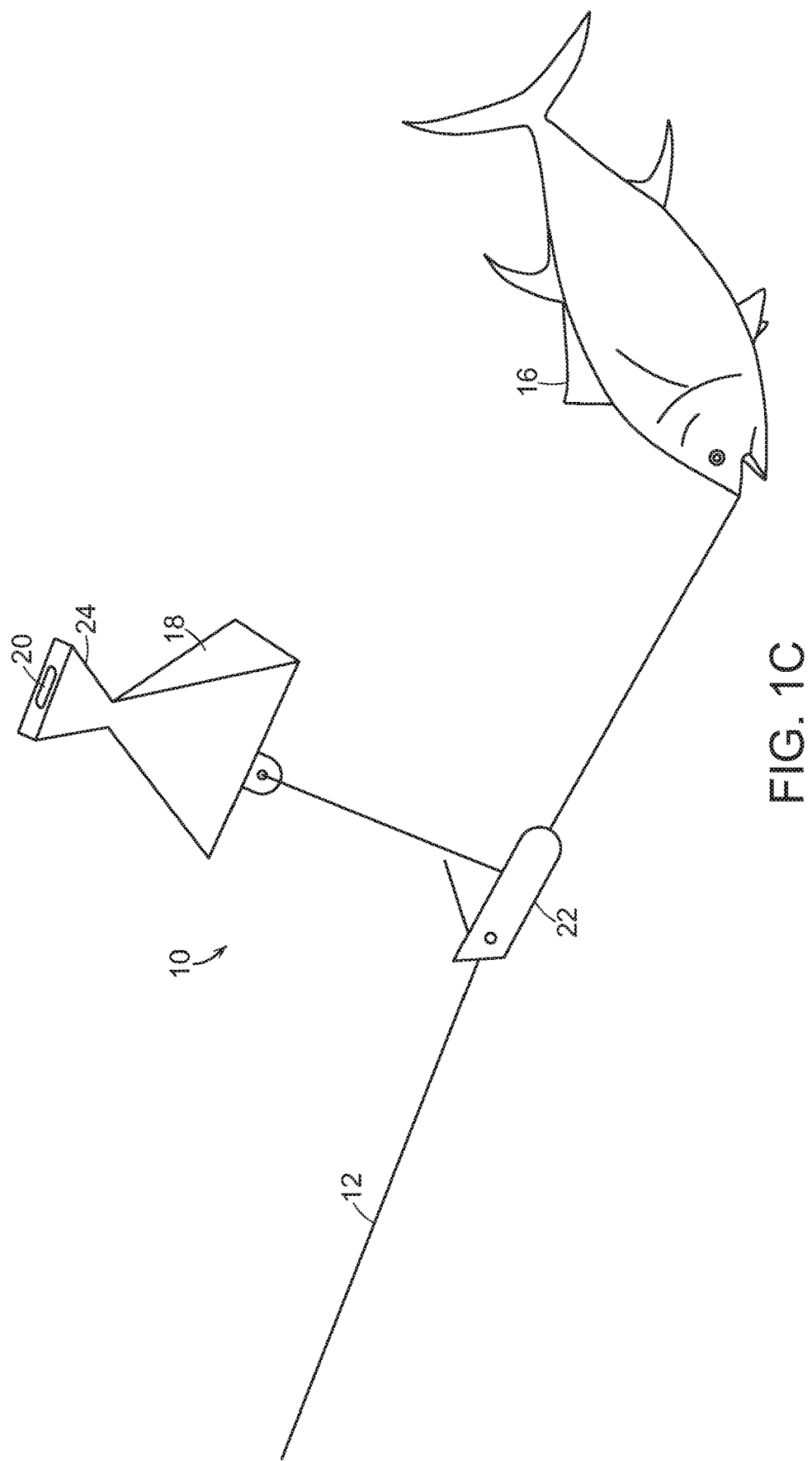

A fish chute in accordance with one or more embodiments is an apparatus for assisting fishermen in retrieving fish that have been hooked, especially large game fish like tuna. FIGS. 1A-1C are simplified drawings (not to scale) that generally illustrate the operation of a fish chute 10 in accordance with one or more embodiments. The fish chute 10 is attached to a fishing line 12 between a rod (not shown) and hook 14. A first fishing line is attached between the rod and the fish chute 10. A second fishing line is attached between the fish chute 10 and the hook. (One end of the fish chute 10 is connected to the first fishing line leading to the rod, and the other end is connected to a second fishing line leading to the hook 14.) Once a fish 16 has been hooked as shown in FIG. 1B, the fish chute 10 deploys a chute 18 as shown in FIG. 1C. As the fish tries to swim away, the chute 18 acts as a drag, slowing the fish down and causing it to tire. In accordance with one or more embodiments, the chute 18 also floats to help bring the fish to the surface.

As discussed below, the fish chute 10 includes a $CO_2$ (or other compressed gas) cartridge 20, which can be similar to those installed in and used for inflating personal floatation devices. The cartridge 20 contains $CO_2$ under sufficient pressure to rapidly fill and eject the chute 18. The cartridge is activated to eject the chute 18 from the main body 22 of the fish chute 10 and cause it to fill into a float. When deployed, the float is shaped to provide a high resistance to movement of the fish.

In accordance with one or more embodiments, the chute includes a top portion 24 that is pyramid-shaped. The top portion fills first with $CO_2$ and functions like a pilot parachute that pulls the rest of the chute 18 out of a pack as it is deployed.

The chute 18 can comprise a variety of materials including, e.g., plastic, nylon, or fabric.

Figure 2:
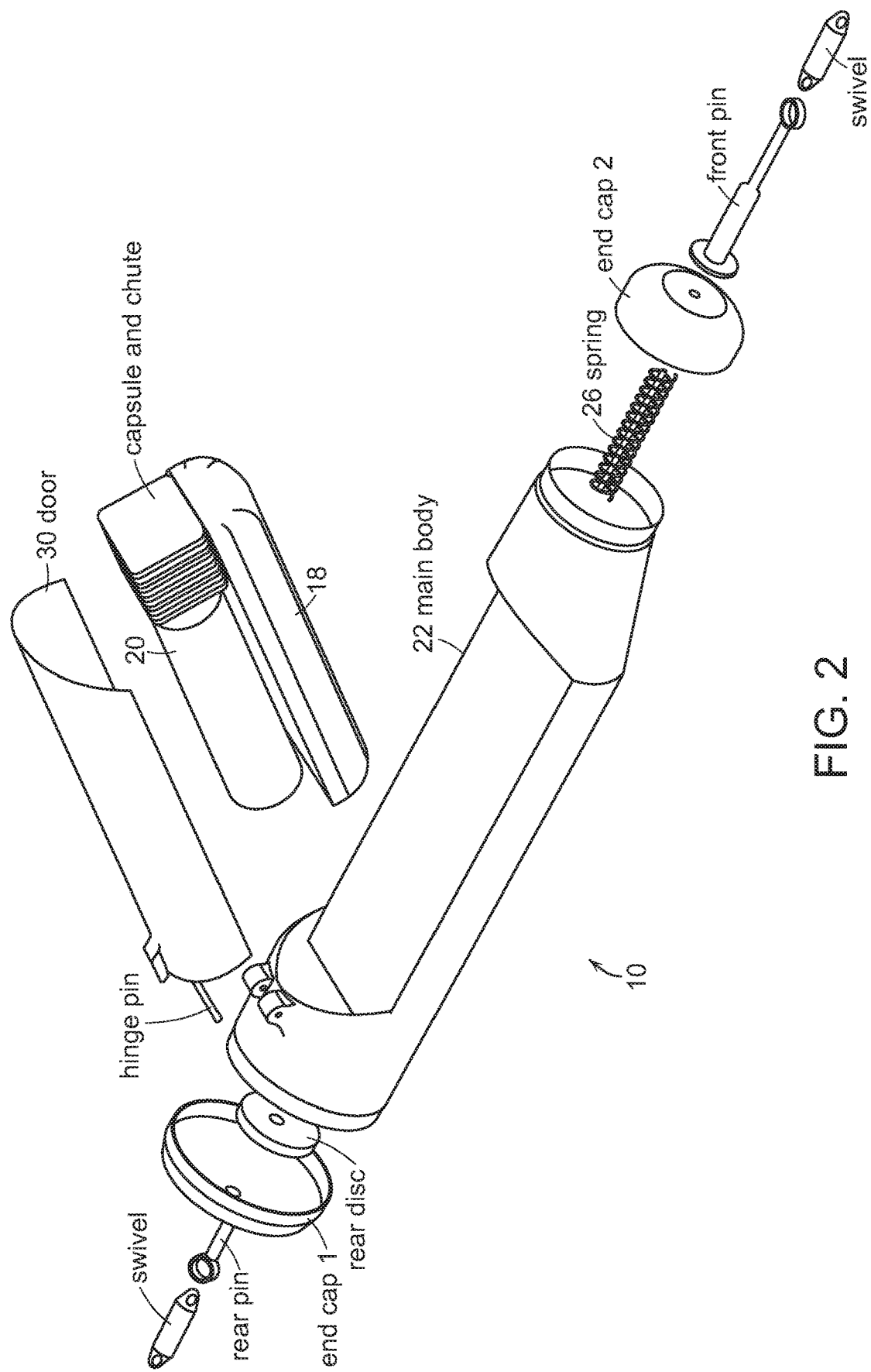
FIG. 2 is an exploded view illustrating select components of a fish chute in accordance with one or more embodiments.
Figure 3:
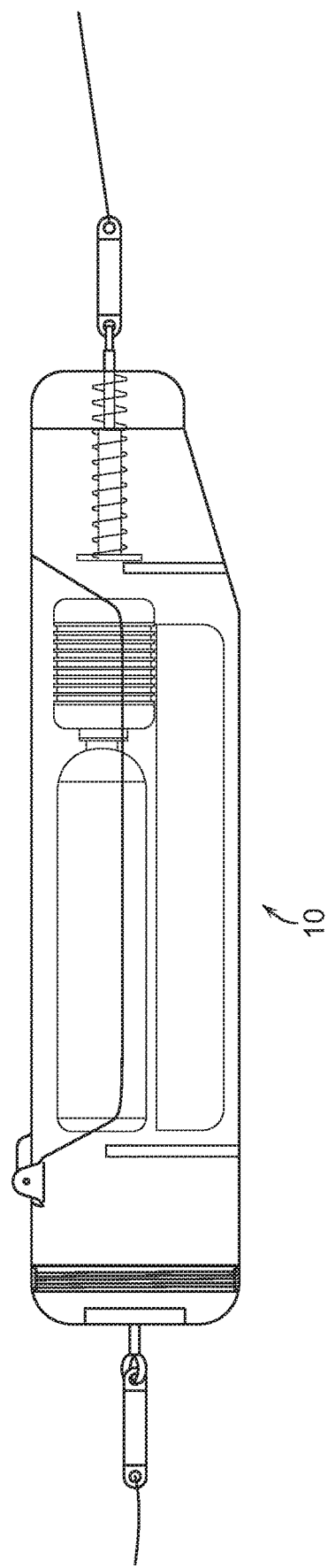
FIG. 3 is a perspective view of a fish chute in accordance with one or more embodiments.

FIG. 2 is an exploded view illustrating select components of the fish chute 10 in accordance with one or more embodiments. FIG. 3 illustrates an assembled fish chute 10.

The fish chute 10 deploys the chute 18 by activating a $CO_2$ cartridge 20 in a similar fashion to $CO_2$ cartridges used in personal floatation devices, which use pull string activation. A switch in the fish chute 10 activates the $CO_2$ cartridge 20, which is attached to the chute 18. The cartridge 20 releases $CO_2$ gas into the chute 18, thereby inflating the chute and popping open a door 30 of the main body 22, which door is otherwise held closed by a magnet (or other biasing mechanism).

To trigger the fish chute device, the fisherman adjusts the drag on the rod after the fish is hooked and on a drag pulling run. The term 'drag' refers to the tension inherent to a fishing reel's design where line can be stripped off of the reel with the bail in the reel position. When the drag is adjusted to a force that is higher than the force applied by the spring 26 in the fish chute 10, the spring 26 becomes compressed. This allows a string connected to the cartridge to be pulled to activate the device as it is attached to the static side opposite of the spring 26.

This mechanism is referred to herein as a 'fish switch' because it involves a drag pulling fish to activate the switch. The switch thus requires a drag (on a fishing reel) pulling fish and a drag adjustment to activate the switch.

By way of non-limiting example, once hooked, the fish pulls drag from the reel and the reel drag is set at 40 lbs. The drag is increased by the fisherman to 50 lbs. and the spring 26 compresses at 45 lbs. and activates the fish switch. The chute 18 then deploys and slows the fish down with its own drag and buoyancy.

Fish chutes in accordance with various embodiments are particularly useful in large game fishing like tuna, which can grow to be larger than 1000 pounds and swim over 50 mph.

It should be understood however that the device can be used with other fish and may be scaled down for smaller fish.

Fish chutes in accordance with various embodiments can be widely used in the fishing industry, including for large game fishing as well as kayak fishing, etc.

Figure 5:
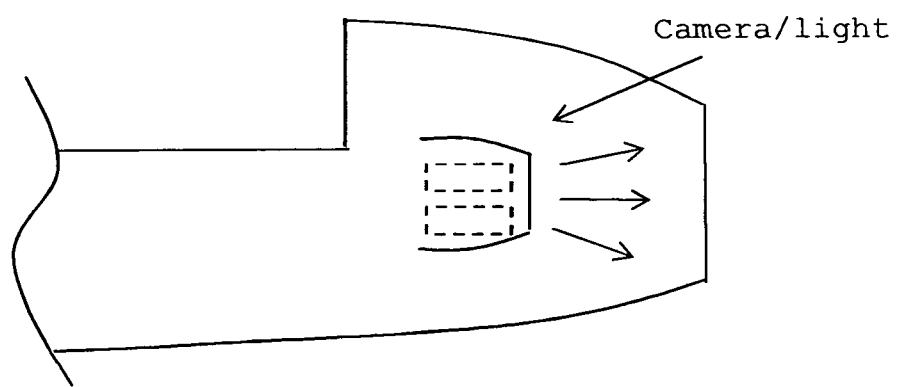
FIG. 5 shows a partial view of the fish chute having a camera and light mounted to the housing.

In accordance with one or more embodiments, fish switches can also activate other devices between the hook and rod. Examples of such other devices can include, without limitation, cameras (e.g., a GoPro® camera) and lighting for such cameras as seen in FIG. 5.

Fish chutes in accordance with various embodiments offer fishermen several advantages, including in slowing down and tiring out hooked fish. Fish chutes can also assist fishermen in spotting the proximate location of the fish underwater. Fish chutes can also keep kayak fishermen from being towed excessively by hooked fish. In addition, fish chutes aid fishermen in fighting the fish by reducing counter force necessary to reel it in.

Figure 4:
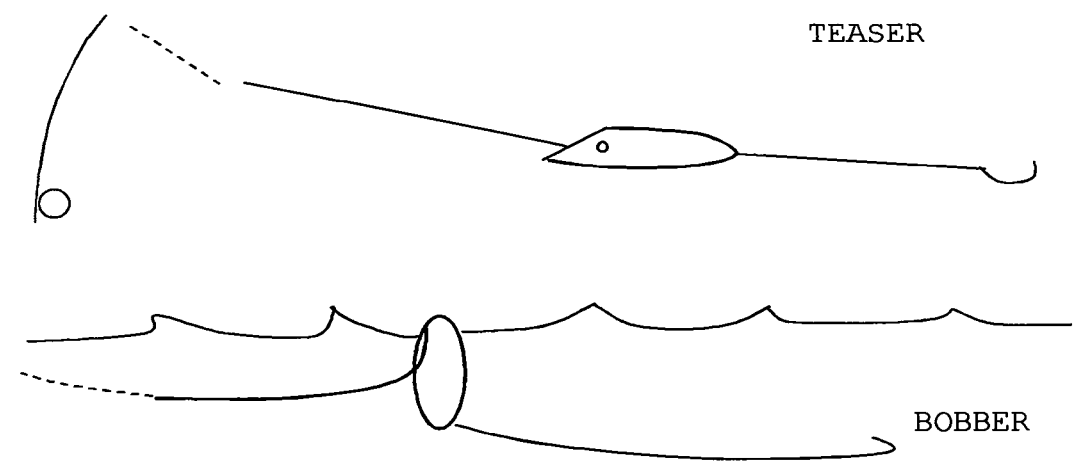
FIG. 4 shows the fish chute being a teaser, or a bobber or an umbrella rig.
Figure 4:
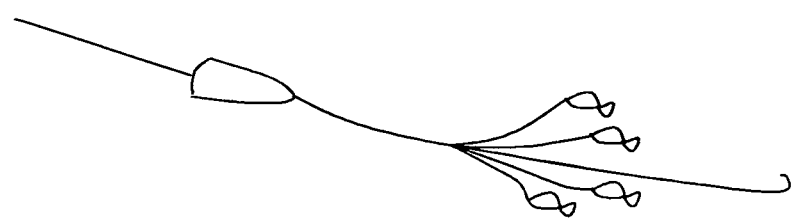

When the chute 18 is not deployed, the fish chute 10 can serve as a teaser, bobber, or part of an umbrella rig. As seen in FIG. 4, a teaser, top item, is used for large salt water species to tease the fish into the vicinity of the lures; the middle device shows a bobber as a float-indicating devices that signal a fish is hooked when the chute surfaces and moves; and the bottom device shows an umbrella rigs to attract fish by replicating the appearance of a school of fish with a door 30 extended.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Additionally, elements and components described herein may be further divided into additional components or joined together to form fewer components for performing the same functions.

Accordingly, the foregoing description and attached drawings are by way of example only, and are not intended to be limiting.

The invention claimed is:

1. A fishing system, said fishing system comprising:
   a rod, said rod having thereon a first fishing line;
   a fish chute, said fish chute comprising:
      a chute in a collapsed state in a housing of said fish chute attached to said first fishing line;
      a compressed gas cartridge cooperatively arranged with the chute to launch the chute when activated; and
      a switch operably connected to the compressed gas cartridge and to a second fishing line having a hook thereon, said switch configured to activate the compressed gas cartridge when drag on at least one of the first and second fishing lines exceeds a given force to launch the chute into a deployed state from said housing.

2. The fish chute of claim 1, wherein the drag on said fishing line includes drag from a pulling fish and a drag adjustment by a user.

3. The fish chute of claim 1, wherein said switch includes a spring movable at said given force.

4. The fish chute of claim 1, wherein the chute includes a pilot portion configured to fill first with compressed gas from the compressed gas cartridge.

5. The fish chute of claim 1, further comprising said housing containing the chute and the compressed gas cartridge, said housing including a door biased toward a closed position, which is opened when the chute is deployed.

6. The fish chute of claim 1, wherein the switch is configured to also activate a camera and/or lighting device.

7. The fish chute of claim 1, wherein the fish chute functions as a teaser or a bobber, or is part of an umbrella rig.

8. A fishing system, said fishing system comprising:
   a rod, said rod having thereon a first fishing line;
   a fish chute, said fish chute comprising:
      a housing having a first element connectable with said first fishing line leading to said rod and a second element connected with a second fishing line leading to a hook, said housing being positioned between said first fishing line leading to said rod and said second fishing line leading to said hook;
      a chute in a collapsed state in said housing;
      a compressed gas cartridge cooperatively arranged with said chute in said housing to launch the chute when activated; and
      a switch operably connected to the compressed gas cartridge and to said second fishing line with the hook thereon, said switch configured to activate the compressed gas cartridge when drag on said second fishing line exceeds a given force to launch the chute into a deployed state.

9. The fish chute of claim 8, wherein the drag on said fishing line includes drag from a pulling fish and a drag adjustment by a user.

10. The fish cute of claim 8, wherein said switch includes a spring movable at said given force.

11. The fish chute of claim 8, wherein the compressed gas cartridge comprises a compressed carbon dioxide cartridge.

12. The fish chute of claim 8, wherein the chute includes a pilot portion configured to fill first when compressed gas from the compressed gas cartridge.

13. The fish chute of claim 8, wherein said housing includes a door biased toward a closed position, which is opened when the chute is deployed.

14. The fish chute of claim 8, wherein the switch is configured to also activate a camera and/or lighting device.

15. The fish chute of claim 8, wherein the fish chute functions as a teaser or a bobber, or is part of an umbrella rig.

16. A fish method, comprising:
   connecting a fish chute in a fishing line between a rod with a first fishing line and a hook of a second fishing line; and
   hooking a fish on said hook of said second fishing line;
   when a fish is hooked and on a drag pulling run, adjusting drag on the rod to a force that is higher than a given force to activate a compressed gas cartridge in the fish chute to launch a chute from the fish chute to resist movement of the fish.

17. The method of claim 16, further comprising simultaneously activating a camera and/or lighting device when the fish chute is launched.

18. The method of claim 16, further comprising using the fish chute as a teaser, bobber, or part of an umbrella rig prior to launching the chute.

19. The method of claim 16, wherein launching the fish chute comprises first filling a pilot portion of the chute with compressed gas from the compressed gas cartridge.

\* \* \* \* \*